United States Patent [19]

Scoggins et al.

[11] 4,051,087
[45] Sept. 27, 1977

[54] COPOLYAMIDE

[75] Inventors: Lacey E. Scoggins; Robert W. Campbell, both of Bartlesville, Okla.

[73] Assignee: Phillips Petroleum Company, Bartlesville, Okla.

[21] Appl. No.: 687,973

[22] Filed: May 20, 1976

[51] Int. Cl.² ............................................. C08G 69/26
[52] U.S. Cl. .............................. 260/18 N; 260/78 R; 260/404.5; 428/474
[58] Field of Search ............... 260/18 N, 78 R, 404.5; 428/474

[56] References Cited

U.S. PATENT DOCUMENTS

| 3,242,141 | 3/1966 | Vertnik et al. | 260/78 R |
| 3,294,758 | 12/1966 | Gabler | 260/78 R |
| 3,499,853 | 3/1970 | Griebsch et al. | 260/18 N |

FOREIGN PATENT DOCUMENTS

| 1,138,142 | 12/1968 | United Kingdom | 260/18 N |
| 1,255,483 | 12/1971 | United Kingdom | 260/18 N |

*Primary Examiner*—Eugene C. Rzucidlo

[57] ABSTRACT

Normally solid, moldable polyamides having diamine-derived structural units of the formula

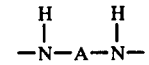

wherein each A is individually selected from the group consisting of 5-methylnonamethylene, 2,4-dimethyloctamethylene, 2,4,6-trimethylheptamethylene, and 4-isopropylheptamethylene; first diacid-derived structural units of the formula

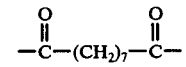

and second diacid-derived structural units of the formula

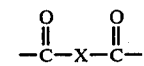

wherein X is a divalent aliphatic hydrocarbon radical containing from 14 to 46 carbon atoms. Minor amounts of other polyamide-forming materials can be included in the copolyamide to provide up to 30 percent of the nitrogen atoms and up to 30 percent of the carbonyl groups. When used as adhesives, these copolyamides possess very good initial T-peel strength.

24 Claims, No Drawings

COPOLYAMIDE

This invention relates to copolyamides. In a specific aspect the invention relates to copolyamides formed from branched $C_{10}$ diamines, azelaic acid, and dimer acids.

The use of commercially available polyamides in the formulation of adhesives, for example, hot melt structural adhesives, has gained in acceptance. However, in some applications wherein the structure being bonded is subjected to additonal forming operations shortly after the application of the adhesive, it is desirable that the adhesive have a greater initial T-peel strength than that provided by some of the commercially available polyamides.

Accordingly, it is an object of the invention to provide a new copolyamide. It is also an object of the invention to provide a copolyamide having good initial T-peel strength. Another object of the invention is to provide an improved polyamide adhesive. Other objects, aspects and advantages of the invention will be apparent from a study of the specification and the appended claims to the invention.

In accordance with the present invention it has been found that the foregoing objectives can be achieved by producing a copolyamide having diaminederived primary structural units of the formula

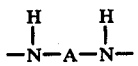

wherein each A is individually selected from the group consisting of 5-methylnonamethylene, 2,4-dimethyloctamethylene, 2,4,6-trimethylheptamethylene, and 4-isopropylheptamethylene; first diacid-derived primary structural units of the formula

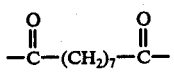

and second diacid-derived primary structural units of the formula

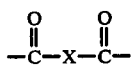

wherein X is a divalent aliphatic hydrocarbon radical containing from 14 to 46 carbon atoms. The term "divalent aliphatic hydrocarbon radical" includes divalent cycloaliphatic hydrocarbon radicals, divalent alkyl-substituted cycloaliphatic hydrocarbon radicals, and other divalent combinations of cycloaliphatic hydrocarbon radicals an acrylic aliphatic hydrocarbon radicals, as well as divalent acyclic aliphatic hydrocarbon radicals.

The A in each of the diamine-derived primary structural units can be solely 5-methylnonamethylene, 2,4-dimethyloctamethylene, 2,4,6-trimethylheptamethylene, or 4-isopropylheptamethylene, but preferably the copolyamide contains a mixture of diamine-drived primary structural units wherein A in some of the units is 5-methylnonamethylene and the A in other units is 2,4-dimethyloctamethylene, with at least 20 percent, preferably at least 50 percent, more preferably at least 70 percent, and even more preferably at least 80 percent, by number, of the A's being 5-methylnonamethylene. Other isomeric diamine-derived primary structural units can be also present wherein the A in some of the units is 2,4,6-trimethylheptamethylene and/or the A in some of the units is 4-isopropylheptamethylene. In an exemplary embodiment, 20 to 96 percent, by number, of the A's are 5-methylnonamethylene, 4 to 80 percent, by number, of the A's are 2,4-dimethyloctamethylene, 0 to 25 percent, by number, of the A's are 2,4,6-trimethylheptamethylene, and 0 to 25 percent, by number, of the A's are 4-isopropylheptamethylene. In a presently preferred embodiment 70 to 96 percent, by number, of the A's are 5-methylnonamethylene, 4 to 30 percent, by number, of the A's are 2,4-dimethyloctamethylene, 0 to 15 percent, by number, of the A's are 2,4,6-trimethylheptamethylene, and 0 to 15 percent, by number, of the A's are 4-isopropylheptamethylene.

The diamine-derived primary structural units can be obtained from principal diamines having the formula $H_2N$—A—$NH_2$ wherein each A is individually selected from the group consisting of 5-methylnonamethylene, 2,4-dimethyloctamethylene, 2,4,6-trimethylheptamethylene, and 4-isopropylheptamethylene. The principal diamine can consist essentially of any one of 5-methyl-1,9-nonanediamine, 2,4-dimethyl-1,8-octanediamine, 2,4,6-trimethyl-1,7-heptanediamine, or 4-isopropyl-1,7-heptanediamine, or mixtures of any two or more thereof, but preferably comprises a mixture of 5-methyl-1,9-nonanediamine and 2,4-dimethyl-1,8-octanediamine, with the 5-methyl-1,9-nonanediamine constituting at least 20, preferably at least 50, more preferably at least 70, and even more preferably at least 80, mole percent of the mixture. 2,4,6-Trimethyl-1,7-heptanediamine and/or 4-isopropyl-1,7-heptanediamine can be present in the mixture. An exemplary suitable mixture for use as the principal diamine comprises 20 to 96 mole percent 5-methyl-1,9-nonanediamine, 4 to 80 mole percent 2,4-dimethyl-1,8-octanediamine, 0 to 25 mole percent 2,4,6-trimethyl-1,7-heptanediamine, and 0 to 25 mole percent 4-isopropyl-1,7-heptanediamine. A presently preferred mixture for use as the principal diamine comprises 70 to 96 mole percent 5-methyl-1,9-nonanediamine, 4 to 30 mole percent 2,4-dimethyl-1,8-octanediamine, 0 to 15 mole percent, 2,4,6-trimethyl-1,7-heptanediamine, and 0 to 15 mole percent 4-isopropyl-1,7-heptanediamine.

The first diacid-derived primary structural units can be obtained from the first principal diacid components having the formula

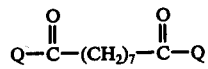

wherein each Q is individually selected from the group consisting of —OH, bromine, chlorine, alkoxy radicals having 1 to 4 carbon atoms, and phenoxy. Preferably each Q is —OH. Exemplary first principal diacid components having this structure include azelaic acid, azelaoyl chloride, azelaoyl bromide, dimethyl azelate, diethyl azelate, dibutyl azelate, methyl ethyl azelate, diphenyl azelate, diisopropyl azelate, diisobutyl azelate, and the like, and mixtures of any two or more thereof.

The second diacid-derived primary structural units can be obtained from second principal diacid components having the formula

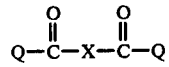

wherein Q and X are as defined hereinabove. The second principal diacid components are preferably relatively pure dimerized fat acids, sometimes referred to as dimer acids, which can be distilled from commercially available polymeric fat acid mixtures. The term "polymeric fat acid" refers to a polymerized fat acid. The term "fat acid" as used herein refers to naturally occurring and synthetic monobasic aliphatic acids having hydrocarbon chains of 8 to 24 carbon atoms. The term "fat acids", therefore, includes saturated, ethylenically unsaturated and acetylenically unsaturated acids.

The saturated, ethylenically unsaturated, and acetylenically unsaturated fat acids are generally polymerized by somewhat different techniques, but because of the functional similarity of the polymerization products, they are all generally referred to as "polymeric fat acids".

Saturated fat acids are difficult to polymerize but polymerization can be obtained at elevated temperatures with a peroxidic catalyst such as di-t-butyl peroxide. Because of the low yields of polymeric products, these materials are not commercially significant. Suitable saturated fat acids include branched and straight chain acids such as caprylic acid, pelargonic acid, capric acid, lauric acid, myristic acid, palmitic acid, isopalmitic acid, stearic acid, arachidic acid, behenic acid, lignoceric acid, and mixtures of any two or more thereof.

The ethylenically unsaturated acids are much more readily polymerized. Catalytic or noncatalytic polymerization techniques can be employed. The noncatalytic polymerization generally requires a higher temperature. Suitable catalysts for the polymerization include clays, di-t-butyl peroxide, boron trifluoride and other Lewis acids, anthraquinone, sulfur dioxide and the like. Suitable monomers which contain ethylenic unsaturation as the only carbon to carbon unsaturation include the branched and straight chain, poly and mono ethylenically unsaturated acids such as 3-octenoic acid, 11-dodecenoic acid, linderic acid, lauroleic acid, myristoleic acid, tsuzuic acid, palmitoleic acid, petroselinic acid, oleic acid, elaidic acid, vaccenic acid, galoleic acid, cetoleic acid, nervonic acid, linoleic acid, linolenic acid, eleostearic acid, hiragonic acid, moroctic acid, timnodonic acid, eicosatetranenoic acid, nisinic acid, scoliodonic acid, chaulmoogric acid, and mixtures of any two or more thereof.

The acetylenically unsaturated fat acids can be polymerized by simply heating the acids. Polymerization of these highly reactive materials will occur in the absence of a catalyst. Acetylenically unsaturated acids occur only rarely in nature and are expensive to synthesize. Therefore, they are not currently of commercial significance. Any acetylentically unsaturated fat acid, both straight chain and branched chain, both mono- and polyunsaturated, are useful for the preparation of the polymeric fat acids. Suitable examples of such materials include tariric acid, stearolic acid, behenolic acid, isamic acid, and mixtures of any two or more thereof.

Because of their ready availability and relative ease of polymerization, oleic acid and linoleic acid $C_{18}$ acids are the preferred starting materials for the preparation of the polymeric fat acids.

Although the dimerized fat acids for use in the production of the copolyamides of this invention can include up to about 30 weight percent of mono-basic aliphatic acids from which they were derived together with higher polymeric fat acids, preferably the purity of the dimerized fat acids is at least 85 weight percent.

In the production of the copolyamides of this invention, the mole ratio of azelaic acid to dimerized fat acid, excluding other acid components which can be present, can vary considerably but generally will be within the range of about 50:50 to about 98:2, preferably within the range of about 60:40 to about 95:5, and more preferably within the range of about 70:30 to about 90:10.

If desired, the polyamide can contain secondary structural units derived from other diamines, diacids, amino acids and/or lactams. In such a polyamide the nitrogen atoms provided by the diamine-derived primary structural units constitute at least 70 percent, preferably at least 80 percent, more preferably at least 90 percent, and even more preferably at least 95 percent, by number, of the total nitrogen atoms in the polyamide. Similarly, the carbonyl groups provided by the total of the first and second diacid-derived primary structural units constitute at least 70 percent, preferably at least 80 percent, more preferably at least 90 percent, and even more preferably at least 95 percent, by number, of the total carbonyl groups in the polyamide.

The secondary structural units can have the formula

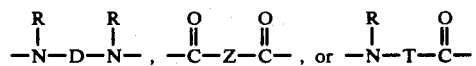

wherein each R is individually selected from the group consisting of hydrogen and alkyl radicals having from 1 to 6 carbon atoms per radical, each D is individually selected from the group consisting of divalent hydrocarbon radicals having from 6 to 16 carbon atoms, each Z is individually selected from the group consisting of divalent hydrocarbon radicals having from 4 to 12 carbon atoms, and each T is individually selected from the group consisting of divalent hydrocarbon radicals having from 5 to 13 carbon atoms. These secondary structural units can be obtained from one or more other diamines having the formula

One or more other diacid components having the formula

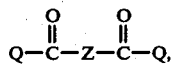

One or more amino acids having the formula

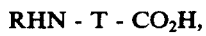

and/or one or more lactams having the formula

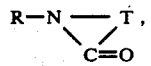

wherein R, D, Q, Z, and T are as hereinbefore defined, each Q preferably being —OH. Thus, there can be employed in the preparation of the polyamide a minor amount of a diamine such as hexamethylenediamine, octamethylendiamine, nonamethylenediamine, decamethylenediamine, hexadecamethylenediamine-N-methylhexamethylenediamine, N,N'-dimethylhexamethylenediamine, N,N'-diethyloctamethylenediamine, N-isopropyl-N'-butyldecamethylenediamine, N,N'-dihexylhexadecamethylenediamine, and/or a minor amount of a dicarboxylic acid or derivative thereof such as adipic acid, pimelic acid, suberic acid, sebaic acid, undecanedioic acid, dodecanedioic acid, tridecanedioic acid, tetradecanedioic acid, 1,4-cyclohexanedicarboxylic acid, terephthalic acid, adipoyl bromide, diphenyl adipate, pimeloyl chloride, dimethyl pimelate, diisopropyl suberate, undecanedioyl chloride, dibutyl tetradecanedioate, or dimethyl terephthalate; and/or a minor amount of an amino acid such as 6-aminohexanoic acid, 8-aminooctanoic acid, 10-aminodecanoic acid, 12-aminododecanoic acid, N-methyl-6-aminohexanoic acid, N-ethyl-7-aminoheptanoic acid, N-isopropyl-12-aminododecanoic acid, or N-hexyl-14-aminotetradecanoic acid; and/or a minor amount of a lactam such as the lactam of any of the above-named amino acids. When present, the secondary structural units will generally provide from 0.01 to 30 percent, preferably from 1 to 25 percent, by number, of the nitrogen atoms and/or from 0.01 to 30 percent, preferably from 1 to 25 percent, by number, of the carbonyl groups in the polyamide.

The diamine and the diacid components can be individually introduced into the polycondensation reaction zone and therein be subjected to suitable polycondensation reaction conditions. Alternatively, at least a portion of the diamine can be reacted with at least a portion of at least one of the dicarboxylic acids to form the corresponding salt. The preformed salt, together with any additional amounts of diamine and/or dicarboxylic acid, can be introduced into the polycondensation reactor and therein be subjected to suitable polycondensation reaction conditions. In the polycondensation reaction zone, the molar ratio of the total diamines to the total diacid components will generally be substantially 1:1, although a slight excess, e.g., up to 5 mole percent, of the diamines or the diacid components can be used.

The polyamides of this invention can be prepared under any suitable polycondensation conditions. In general, in a preferred procedure in which the diacid components are employed as dicarboxylic acids, the mixture of monomers and/or salts thereof can be heated at temperatures in the range of about 200° to about 340° C, preferably in the range of about 260° C to about 320° C for a period of time in the range of about 1 hour to about 24 hours, preferably in the range of about 1.5 hours to about 8 hours. The pressure normally reaches a maximum of not more than about 1000 psig, preferably not more than about 600 psig, and is allowed to diminish by venting gaseous material, sometimes with the aid of an inert gas, the final heating being conducted at a pressure as low as about 1 mm Hg, preferably in the range of about 10 to about 50 mm Hg. If desired, the mixtures of monomers and/or salts can be heated at a lower temperature, e.g., in the range of about 200° to about 230° C, for a period of time, e.g., in the range of about ½ hour to about 16 hours, prior to the heating to a temperature in the range of about 260° C to about 320° C. Water can be present to serve as a heat transfer agent and to aid in keeping the reactants in the reaction zone. Acetic acid can be present, if desired, in an amount up to about 2 mole percent based on the total diacid, to control and stabilize the molecular weight of the polyamide. A thermoxidative stabilizer such as manganese lactate can be employed, if desired.

When diacid components other than dicarboxylic acids are employed, reaction conditions known in the art for use with such diacid components, sometimes differing from those described above, can be used in the production of the polyamides of this invention.

The polyamides of this invention can be employed as molding resins, as hot melt adhesives, or in the production of coatings or films. In general the polyamides of this invention will have an inherent viscosity (as measured at 30° C in a m-cresol solution having a polymer concentration of 0.5 gram/100 milliliters solution) of at least 0.4, preferably in the range of 0.6 to 2. In general, when used as hot melt adhesives, the copolyamides of this invention will have an initial T-peel strength (determined as shown in Example VI) for aluminum-to-aluminum bonding of at least 10 pounds per inch width (1.8 kilograms per centimeter width), preferably of at least 14 pounds per inch width (2.5 kilograms per centimeter width), and more preferably of at least 15 pounds per inch width (2.7 kilograms per centimeter width); a lap shear strength (ASTM D 1002-72) for aluminum-to-aluminum bonding of at least 500, preferably at least 600, pounds per square inch of shear area.

The copolyamides of this invention can be blended with various additives such as fillers, pigments, stabilizers, softeners, extenders, or other polymers. For example, there can be incorporated in the polymers of this invention substances such as graphite, carbon black, titanium dioxide, glass fibers, carbon fibers, metal powders, magnesia, silica, asbestos, wollastonite, clays, wood flour, cotton floc, alpha cellulose, mica, and the like. If desired, such additives can be added to the polymerization reactor.

EXAMPLES

In the following Examples, values for inherent viscosity were determined at 30° C in m-cresol at a polymer concentration of 0.5g/100 ml solution. Values for glass transition temperature ($T_g$) and crystalline melting point ($T_m$) were determined on premelted and quenched polymer samples by differential thermal analysis. The values for polymer-melt temperature (PMT) were determined by placing portions of the polymer on a heated bar with a temperature gradient.

EXAMPLE I

This Example describes the preparation of a copolyamide within the scope of this invention.

To a 1-liter stirred autoclave were charged 87.87 g (0.51 mole) of a mixture of isomeric diamines consisting of 89.75 weight percent 5-methyl-1,9-nonanediamine, 9.54 weight percent 2,4-dimethyl-1,8-octane-diamine, 0.01 weight percent 2,4,6-trimethyl-1,7-heptanediamine, and 0.70 weight percent 4-isopropyl-1,7-heptanediamine, 70.58 g (0.375 mole) azelaic acid, 71.13 g (about 0.125 mole) Hystrene 3697 $C_{36}$ dimer acid (a mixture of carboxylic acids containing 97 weight percent $C_{36}$ dimer acid, 3 weight percent $C_{54}$ trimer acid), and 50 g distilled water. The autoclave was alternately pressured to 150 psig with nitrogen, followed by venting to atmospheric pressure, a total of four times, then sealed under a pressure of 40 psig nitrogen. The autoclave was then heated to 210° C for 2 hours, heated from 210° C to 290° C during 35 minutes, and maintained at 290° C for 1 hour, venting as necessary to maintain the pressure at 400 psig, after this pressure was attained. The autoclave was then heated further at 290° C, first for 30 minutes while venting to 0 psig, then for 30 minutes under a flow of nitrogen at substantially atmospheric pressure, then for 15 minutes while reducing the pressure to 20 mm Hg, and finally for 30 minutes at 20 mm Hg. The resulting amorphous copolyamide, upon removal from the autoclave, was observed to be transparent and was found to have an inherent viscosity of 0.63, a $T_g$ of 15° C, and a PMT of 114° C. Samples of the copolyamide compression molded at 127° C were found to have the properties shown in Table I.

TABLE I

| | |
|---|---|
| Density, g/cc (a) | 0.9975 |
| Tensile break, psi (b) | 2280 |
| Elongation, % (b) | 657 |
| Set at break, % (c) | 289 |
| Hardness, Shore D (d) | 55 |

(a) ASTM D 1505-68.
(b) ASTM D 638-68.
(c) ASTM D 412-68.
(d) ASTM D 2240-68.

Thus, the copolyamide was flexible at low temperatures, based on its low $T_g$, was tough, based on the high elongation value; and possessed elastomeric character, based on the high elongation and set at break. Furthermore, this copolyamide exhibited good adhesive properties, as shown in Example VI.

EXAMPLE II

This Example describes the preparation of a copolyamide within the scope of this invention, employing a different ratio of reactants than that used in Example I.

To a 1-liter stirred autoclave were charged 87.87 g (0.51 mole) of a mixture of isomeric diamines consisting of 89.75 weight percent 5-methyl-1,9 -nonanediamine, 9.54 weight percent 2,4-dimethyl -1,8-octanediamine, 0.01 weight percent 2,4,6-trimethyl-1,7-heptanediamine, and 0.70 weight percent 4-isopropyl-1,7-heptanediamine, 82.34 g (0.4375 mole) azelaic acid, 35.565 g (about 0.6025 mole) Hystrene 3697 $C_{36}$ dimer acid (97 weight percent $C_{36}$ dimer acid, 3 weight percent $C_{54}$ trimer acid), and 50 g distilled water. The reactor was then flushed with nitrogen and sealed under nitrogen pressure as in Example I. The autoclave was heated to 210° C, maintained at 210° C for 2 hours, heated from 210° C to 290° C during 45 minutes, and maintained at 290° C for 1 hour, venting as necessary to maintain the pressure at about 400 psig, after this pressure was attained. The autoclave was then heated further at 290° C, first for 30 minutes while venting to 0 psig, then for 30 minutes under a flow of nitrogen at substantially atmospheric pressure, then for 15 minutes while reducing the pressure to 20 mm Hg, and finally for 30 minutes at 20 mm Hg. The resulting amorphous copolyamide, upon removal from the autoclave, was observed to be transparent and was found to have an inherent viscosity of 0.68, a $T_g$ of 15° C, and a PMT of 126° C. Samples of the copolyamide compression molded at 127° C were found to have the properties shown in Table II, determined by the methods given in Example I.

TABLE II

| | |
|---|---|
| Density, g/cc | 1.0130 |
| Tensile break, psi | 3970 |
| Elongation, % | 1310 |
| Set at break, % | 328 |
| Hardness, Shore D | 65 |

Thus, the copolyamide was flexible at low temperature, based on its low $T_g$; was tough, based on the high value for elongation and possessed elastomeric character, based on the high elongation value and set at break.

EXAMPLE III

This Example describes the preparation of a copolyamide outside the scope of this invention, using hexamethylenediamine as the diamine reactant.

To a 1-liter stirred autoclave were charged 59.267 g (0.51 mole) hexamethylenediamine, 70.58 g (0.375 mole) azelaic acid, 71.13 g (about 0.125 mole) Hystrene 3697 $C_{36}$ dimer acid (97 weight percent $C_{36}$ dimer acid, 3 weight percent $C_{54}$ trimer acid), and 50 g distilled water. The reactor was then flushed with nitrogen and sealed under nitrogen pressure as in Example I, and the polymerization was conducted as described in Example I. The resulting copolyamide, unlike those in Example I and II, was partially crystalline. This copolyamide had an inherent viscosity of 0.70, a $T_g$ of 18° C, a $T_m$ of 186° C, and a PMT of 160° C. Samples of the copolyamide compression molded at 160° C were found to have the properties shown in Table III, determined by the methods given in Example I.

TABLE III

| | |
|---|---|
| Density, g/cc | 1.0380 |
| Tensile break, psi | 2340 |
| Elongation, % | 8 |
| Set at break, % | Not determined |
| Hardness, Shore D | 71 |

Thus, as compared with the copolyamides in Example I and Example II, this copolyamide as of much lower toughness, and possessed little or no elastomeric character, based on the low value for elongation. Adhesive properties of this copolyamide are shown in Example VI.

EXAMPLE IV

This Example describes the preparation of a polyamide outside the scope of this invention, using a mixture of isomeric $C_{10}$ diamines and azelaic acid in the absence of $C_{36}$ dimer acid. Although the reaction conditions differed to some extent from those used in the previous Examples, it is not believed that the resulting polyamide was significantly different from the polyamide which would have been produced had the conditions been precisely comparable to those used in the previous Examples.

To 5-gallon (19 -liter) stirred autoclave were charged 1202.72 g (6.98 moles) of a mixture of isomeric diamines consisting of 89.78 weight percent 5-methyl-1,9-nonanediamine, 9.77 weight percent 2,4-dimethyl-1,8-octanediamine, 0.12 weight percent 2,4,6-trimethyl-1,7-heptanediamine, and 0.33 weight percent 4-isopropyl-1,7-heptanediamine, 1313.77 g (6.98 moles) azelaic acid, 629.12 g distilled water, and 0.1189 g manganese lactate (a thermal stabilizer). The autoclave was alternately pressured to 300 psig with nitrogen, followed by venting to atmospheric pressure, a total of three times, then sealed under a pressure of 40 psig nitrogen. The autoclave was then heated to 210° C, maintained at 210° C for 2½ hours, heated from 210° C to 290° C during 35 minutes, and maintained at 290° C for 30 minutes, the maximum pressure attained being 425 psig. The autoclave was then heated at 290–295° C, first for 30 minutes while venting to 0 psig, then for 30 minutes under a flow of nitrogen at substantially atmospheric pressure, then for 15 minutes while reducing the pressure to 76 mm Hg, and finally for 40 minutes at 76 mm Hg. The resulting polyamide, unlike those in Examples I and II, was partially crystalline. This polyamide had an inherent viscosity of 1.1, a $T_g$ of 25° C, and a $T_m$ of 100° C. Samples of the polyamide injection molded using a barrel temperature of 190° C and a mold temperature of 10° C were found to have the properties shown in Table IV, determined by the methods given in Example I.

TABLE IV

| Density, g/cc | 1.029 |
| Tensile break, psi | 7810 |
| Elongation, % | 1005 |
| Set at break, % | Not determined |
| Hardness, Shore D | 75 |

In view of its higher $T_g$, this polyamide was incapable of remaining as flexible at low temperaures as were the polyamides produced in Examples I and II. Adhesive properties of the polyamide of Example IV are shown in Example VI.

EXAMPLE V

This Example describes the preparation of a copolyamide outside the scope of this invention, using adipic acid instead of the azelaic acid.

To a 1-liter stirred autoclave were charged 87.88 g (0.51 mole) of isomeric diamines consisting of 89.56 weight percent 5-methyl-1,9-nonanediamine, 10.02 weight percent 2,4-dimethyl-1,8-octanediamine, 0.11 weight percent 2,4,6-trimethyl-1,7-heptanediamine, and 0.31 weight percent 4-isopropyl-1,7-heptanediamine, 63.86 g (0.437 mole) adipic acid, 35.56 g (about 0.0625 mole) Hystrene 3697 $C_{36}$ dimer acid (97 weight percent $C_{36}$ dimer acid, 3 weight percent $C_{54}$ trimer acid), and 47 g distilled water. The reactor was then flushed with nitrogen and sealed under nitrogen pressure as in Example I. The autoclave was heated at 210° C for 2 hours, heated from 210° C to 290° C during 44 minutes, and maintained at 290° C for 1 hour, venting as necessary to maintain the pressure at about 400 psig, after this pressure was attained. The autoclave was then heated further at 290° C, first for 30 minutes while venting to 0 psig, then for 30 minutes under a flow of nitrogen at substantially atmospheric pressure, then for 20 minutes while reducing the pressure to 20 mm Hg, and finally for 30 minutes at 20 mm Hg. The resulting copolyamide, unlike those in Examples I and II, was partially crystalline. This copolyamide had an inherent viscosity of 0.94, a $T_g$ of 30° C, and a $T_m$ of 177° C. Adhesive properties of this polymer are shown in Example VI.

EXAMPLE VI

The polyamides produced in Examples I, II, III, IV and V were evaluated as hot melt adhesives. Also evaluated as a hot melt adhesive, for the purpose of comparison, was Milvex 1235 polyamide, a commercial hot melt adhesive. Lap shear strength was determined by the method of ASTM D 1002-72 for aluminum-to-aluminum bonding, the aluminum coupons previously having been washed with toluene and with acetone and then grit blasted. The lap shear strength was determined on specimens before and after immersion in boiling water for 24 hours. T-peel strength was determined by placing a film of the polymer between 5-mil aluminum sheets, previously washed with toluene and with acetone and then grit, blasted, and then pressing at a temperature slightly above the polymer-melt temperature for 15 minutes at 5 tons ram force, followed by cutting the bonded sheets into strips 1 inch wide and pulling on an Instron test machine at a rate of 20 inches per minute. The results are summarized in Table V.

TABLE V

| | Hot Melt Adhesive Properties at 25° C* | | | |
| | Lap Shear Strength, psi | | Retention of Lap Shear Strength, % | T-Peel Strength ppiw |
| Polymer | Before Water Boil Treatment | After Water Boil Treatment | | |
|---|---|---|---|---|
| Polyamide from Example I | 660 | 220 | 33.3 | 26.2 |
| Polyamide from Example II | 960 | — | — | 20.8 |
| Polyamide from Example III | 1300 | 580 | 44.6 | 4.0 |
| Polyamide from Example IV | 880 | 190 | 21.6 | 2.6 |
| Polyamide from Example V | 2020 | 1640 | 81.2 | 7.9 |
| Milvex 1235 Polyamide | 1900 | 1150 | 60.5 | 2.8 |

Thus, the polyamide from Example I, a polyamide within the scope of this invention, had satisfactory lap shear strength for use as a hot melt adhesive, and both it and the polyamide from Example II, also a polyamide within the scope of this invention, exhibited outstanding T-peel strength which was far superior to that provided by any of the other polyamides in Table V.

That which is claimed is:

1. A normally solid, moldable copolyamide having: diamine-derived primary structural units of the formula

wherein each A is individually selected from the group consisting of 5-methylnonamethylene, 2,4-dimethyloctamethylene, 2,4,6-trimethylheptamethylene, and 4-isopropylheptamethylene;

first diacid-derived primary structural units of the formula

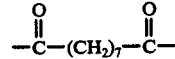

and second diacid-derived primary structural units of the formula

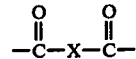

wherein X is divalent aliphatic hydrocarbon radical containing from 14 to 46 carbon atoms;
the nitrogen atoms provided by said diamine-derived primary structural units constituting at least 70 percent, by number, of the total nitrogen atoms in said copolyamide; the carbonyl groups provided by said first and second diacid-derived structural units constituting at least 70 percent, by number, of the total carbonyl groups in said copolyamide;

the molar ratio of the total diamine-derived structural units to the total diacid-derived structural units being in the range of 105:100 to 100:105.

2. A copolyamide in accordance with claim 1 wherein the balance, if any, of the nitrogen atoms and carbonyl groups in said copolyamide is provided by secondary structural units selected from the group consisting of

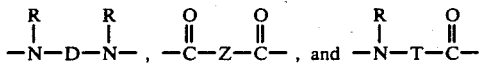

wherein each R is individually selected from the group consisting of hydrogen and alkyl radicals having from 1 to 6 carbon atoms per radical, each D is a divalent hydrocarbon radical having from 6 to 16 carbon atoms, each Z is a divalent hydrocarbon radical having from 4 to 12 carbon atoms and each T is a divalent hydrocarbon radical having from 5 to 13 carbon atoms.

3. A copolyamide in accordance with claim 2 wherein at least 80 percent, by number, of the nitrogen atoms in said copolyamide are provided by said diamine-derived primary structural units, and at least 80 percent, by number, of the carbonyl groups in said copolyamide are provided by said first and second diacid-derived primary structural units.

4. A copolyamide in accordance with claim 3 wherein the ratio of said first diacid-derived primary structural units to said second diacid-derived primary structural units is in the range of about 50:50 to about 98:2.

5. A copolyamide in accordance with claim 4 wherein the A in at least 50 percent, by number, of said diamine-derived primary structural units is 5-methylnonamethylene.

6. A copolyamide in accordance with claim 4 wherein the A's in said diamine-derived primary structural units are from 20 to 96 percent, by number, 5-methyl-nonamethylene, from 4 to 80 percent, by number, 2,4-dimethyloctamethylene, from 0 to 25 ;1 percent, by number, 2,4,6-trimethylheptamethylene, and from 0 to 25 percent, by number, 4-isopropylheptamethylene.

7. A copolyamide in accordance with claim 6 wherein in A in at least 50 percent, by number, of said diamine-derived primary structural units is 5-methylnonamethylene.

8. A copolyamide in accordance with claim 7 wherein the ratio of said first diacid-derived primary structural units to said second diacid-derived primary structural units is in the range of about 60:40 to about 95:5.

9. A copolyamide in accordance with claim 7 wherein the ratio of said first diacid-derived primary structural units to said second diacid-derived primary structural units is in the range of about 70:30 to about 90:10.

10. A copolyamide in accordance with claim 9 wherein the A's in said diamine-derived primary structural units comprise at least 70 percent, by number, 5-methylnonamethylene and at least 4 percent, by number, 2,4-dimethyloctamethylene.

11. A copolyamide in accordance with claim 10 wherein at least 95 percent, by number, of the nitrogen atoms in said copolyamide are provided by said diamine-derived primary structural units, and at least 95 percent, by number, of the carbonyl groups in said copolyamide are provided by said first and second diacid-derived primary structural units.

12. A copolyamide in accordance with claim 11 wherein X has 34 carbon atoms.

13. A copolyamide in accordance with claim 1 wherein X has 34 carbon atoms.

14. A copolyamide in accordance with claim 1 wherein said second diacid-derived primary structural units are derived from at least one dimer acid.

15. A copolyamide in accordance with claim 1 wherein said copolyamide has an initial T-peel strength for aluminum-to-aluminum bonding of at least 10 pounds per inch width.

16. A copolyamide in accordance with claim 1 wherein said copolyamide has an initial T-peel strength for aluminum-to-aluminum bonding of at least 15 pounds per inch width.

17. A laminate comprising first and second substrates having interposed therebetween and thermally bonded to each thereof a layer of a copolyamide in accordance with claim 1.

18. A laminate comprising first and second substrates having interposed therebetween and thermally bonded to each thereof a layer of a copolyamide in accordance with claim 12.

19. A normally solid, moldable copolyamide having: diamine-derived primary structural units of the formula

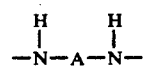

wherein each A is individually selected from the group consisting of 5-methyl-nonamethylene, 2,4-dimethyloctamethylene, 2,4,6-trimethylheptamethylene, and 4-isopropylheptamethylene;

first diacid-derived primary structural units of the formula

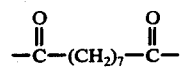

and second diacid-derived primary structural units of the formula

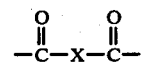

wherein X is a divalent aliphatic hydrocarbon radical containing from 14 to 46 carbon atoms;

the nitrogen atoms provided by said diamine-derived primary structural units constituting at least 95 percent, by number, of the total nitrogen atoms in said copolyamide; the carbonyl groups provided by said first and second diacid-derived structural units constituting at least 70 percent, by number, of the total carbonyl groups in said copolyamide;

the molar ratio of the total diamine-derived structural units to the total diacid-derived structural units being in the range of 105:100 to 100:105.

20. A copolyamide in accordance with claim 19 wherein the balance, if any, of the nitrogen atoms and carbonyl groups in said copolyamide is provided by secondary structural units selected from the group consisting of

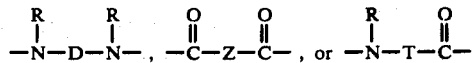

wherein each R is individually selected from the group consisting of hydrogen and alkyl radicals havng from 1 to 6 carbon atoms per radical, each D is a divalent hydrocarbon radical having from 6 to 16 carbon atoms, each Z is a divalent hydrocarbon radical having from 4 to 12 carbon atoms and each T is a divalent hydrocarbon radical having from 5 to 13 carbon atoms.

21. A copolyamide in accordance with claim 19 wherein the carbonyl groups provided by said first and second diacid-derived structural units constitute at least 90 percent, by number, of the total carbonyl groups in said copolyamide.

22. A copolyamide in accordance with claim 19 wherein the ratio of said first diacid-derived primary structural units to said second diacid-derived primary structural units is in the range of about 50:50 to about 98:2.

23. A copolyamide in accordance with claim 19 consisting essentially of said diamine-derived primary structural units, said first diacid-derived primary structural units and said second diacid-derived primary structural units.

24. A copolyamide in accordance with claim 23 wherein the ratio of said first diacid-derived primary structural units to said second diacid-derived primary structural units is in the range of about 50:50 to about 98:2.